INVENTORS
NICHOLAS AMODIO
GUNNAR A.F. WINCKLER

United States Patent Office 2,983,899
Patented May 9, 1961

2,983,899
CONNECTOR DEVICE

Nicholas Amodio, East Haven, and Gunnar A. F. Winckler, Milford, Conn., assignors to Olin Mathieson Chemical Corporation, a corporation of Virginia Filed May 26, 1958, Ser. No. 737,640
3 Claims. (Cl. 339—258)

The present invention relates to connector devices and in particular to electrical connector devices operative to effect a physical and electrical connection among a plurality of dry cell batteries disposed physically in series.

A particular feature of the invention is the provision of a simple connector device operative to connect the base of one battery to the head of a next adjacent one quickly.

Frequently certain elements of a dry cell battery are fabricated from materials which do not react well with solder or welding wire; consequently, it is desirable to utilize auxiliary means for connecting the cells mechanically and electrically. For example, cells manufactured of magnesium present a difficult and laborious problem when one undertakes to solder or weld leads to such a material.

Furthermore, frequently the central pole of a conventional dry cell is fabricated of graphite or other soft material capped with a brass cup or the like. Inherently, such an element does not provide or develop structural rigidity or strength. For example, it would be exceedingly difficult to make a physically strong connection between the base of one dry cell and the head of the other where the connection depended upon a soldered connection to the cap of the central pole.

A connector device embracing certain features of the present invention may comprise a cup-shaped connector made from spring metal such as Phosphor-bronze, spring steel or berillium copper fabricated so as to receive the bottom of a first cell in a relatively tight fit. The cup is formed with a lower, central aperture to receive the central terminal or pole of the head end of a second cell. The aperture is formed undersize with respect to the size of the central terminal for a reason which will become more apparent hereinafter. The bottom of the cup is split radially wherein slits are formed so as to run from the edge of the aperture radially outward effective to develop a plurality of tabs or tines, each having a generally arcuate portion and all cooperating to define the exterior contour or shape of the central terminal. When the metallic cap or head of the central terminal of a cell is pushed into the aperture, there is slight interference and the tabs tend to bend slightly away from the cap to permit the central terminal to move into the aperture.

Since the tabs are formed of a spring metallic material there is a tendency for them to return to their original position so that upon release of pressure, tending to drive the central terminal into the aperture, the tabs spring to their original position and bite into the metal cap. Since the base of one cell is held snugly in the main body of the cup and the central terminal of another is held by the tabs in the fashion just described, it is apparent that the present invention provides a physical and an electrical connector between dry cells arranged ad seriatim.

Although battery cells and their central terminals are frequently circular in cross-section it is not intended that the invention be so limited. Thus, the cup and the aperture may take any desired configuration depending upon the corresponding structure of the cell and its central pole. For example, the cell or the pole or both may be square, rectangular or hexagonal in cross-section.

Other features and advantages of the present invention will become more apparent from a study of the succeeding specification when read in conjunction with the appended drawings in which.

Figure 1:
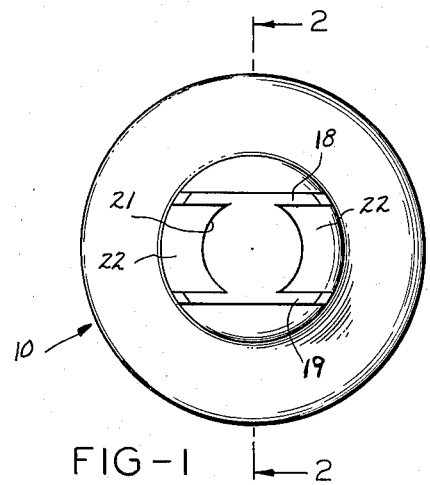
Fig. 1 is a plan view of the connector of the present invention as viewed from the top thereof.
Figure 2:
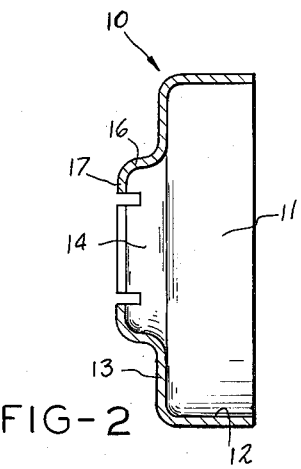
Fig. 2 is a sectional view of Fig. 1 as viewed in the plane of line 2—2.

Referring now to the drawings and in particular to Figs. 1 and 2, there is shown a cup-like metallic connector element designated generally by the reference numeral 10. The connector 10 embraces a cup element 11 having a sidewall 12 and a contiguous bottom wall 13 blending into a recessed well 14 having a sidewall 16 and a face 17.

As stated previously, the connector 10 is preferably fabricated of spring metallic material so that a plurality of slots 18 suitably formed in the well 14 are effective in cooperation with an aperture 21 to define a pair of opposed resilient tabs or tines 22.

The aperture 21 is formed with a diameter which is slightly less than the outer diameter of a central pole 23 (Fig. 3) projecting from a cell 24. Correspondingly, the internal diameter of the cup 11 is so selected with respect to the external diameter of an adjacent cell 26 so that the cell 26 makes a tight fit into the cup 11.

Here again by virtue of the spring metallic nature of the connector device and the rounded corners at the base of a dry cell, as at 27, it is possible to push the base of the cell snugly into the cup by springing the sidewall 12 outwardly slightly.

Since the central pole 23 is frequently formed of graphite with an appropriate brass cap or the like enclosing the portion thereof which projects from the main body of the cell, it is desirable to eliminate bending stress in the graphite element so as to preclude breaking or separation of the element from the main body of the cell.

Figure 3:
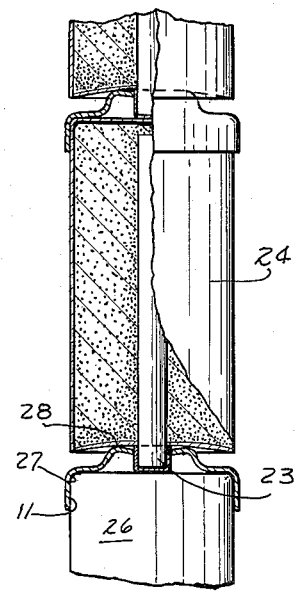
Fig. 3 is a view showing a plurality of battery cells connected in series by means of the connector of the present invention.

This occurrence is prevented to a large extent by the annular configuration of the face 17 wherein this face makes areal contact with a corresponding surface immediately surrounding the central element of a cell as at 28 in Fig. 3.

The battery elements are connected by seating the base of one cell into the cup 11 while the head or central pole of an adjacent cell is forced into the aperture 21. As the central pole or electrode terminal enters the aperture 21 there is sufficient interference between the exterior diameter of the terminal and the diameter of the aperture 21 to cause the tines to deflect or bend inwardly slightly. The terminal is pushed home against the bottom of the next succeeding cell and thereafter release of pressure upon the cells being joined will permit the tines 22 to deflect outwardly towards the normal position whereupon the tines will engage or bite into the brass cap characterizing the terminal of the central electrode. Obviously, any number of dry cells having other dimension characteristics can be mechanically and electrically fastened together in series utilizing the principles of the present invention.

Figure 4:
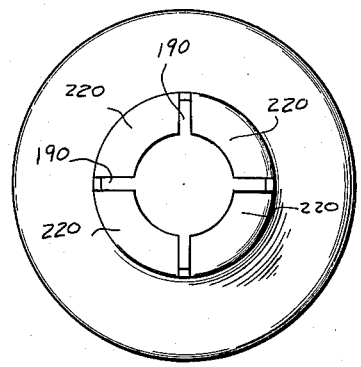
Fig. 4 is a modification of the connector illustrated in Fig. 1.
Figure 5:
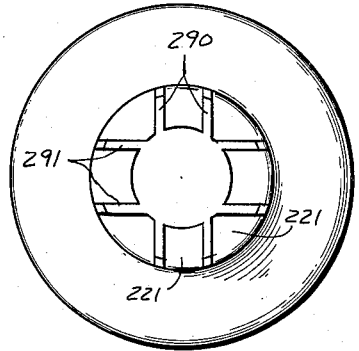
Fig. 5 is a still further modification thereof.

Referring now to Figs. 4 and 5, it is apparent that tines 220 may be formed by disposing slots 190 normal to one another, each passing through the center of the connector. In Fig. 5 tines are developed by disposing two pairs of generally parallel slots 290 and 291 generally normal to one another thereby developing eight tines 221.

It is anticipated that a wide variety of modifications and variations may be devised, each utilizing the principles of the present invention.

What is claimed is:

1. An electrical and mechnaical connector device for fastening a plurality of battery cells together in series comprising a spring metallic element having a cup portion for receiving one end of a battery cell, said cup portion being formed with a well portion having a flat face, said face being offset with respect to the cup portion and having a central, circular aperture formed therein, and at least one slot formed in the face and intercepting said aperture so as to define a pair of flat tines, said tines being co-planar with the face said aperture and said tines cooperating to receive a terminal portion of a central electrode of another cell in frictional fashion, the face of said well being operative to make areal contact with the region of said other cell immediately surrounding the central electrode.

2. An electrical and mechanical connector device for fastening a plurality of dry cells together in series comprising a spring metallic element having a cup portion for frictionally receiving one end of a battery cell, said cup portion being formed with a well portion having a flat face, said face being offset with respect to the cup portion and having a central circular aperture formed therein, and a plurality of slots formed in the face of the well and intercepting said aperture so as to define a plurality of flat tines, being co-planar with the face, said aperture and said tines cooperating to receive and frictionally grasp a terminal portion of another cell thereby connecting said cells in series physically, the face of said well being operative to make areal contact with the region of said other cell immediately surrounding the terminal portion thereof.

3. An electrical and mechanical connector device for fastening a plurality of dry cells together in series comprising a spring metallic element having a cup portion for receiving one end of a battery cell, said element being formed with a well portion having a flat face, said face being offset with respect to the cup portion and having a central circular aperture formed therein, and two pairs of slots formed in the face of the well and intercepting said aperture so as to define a plurality of flat tines, said tines being co-planar with the face, one pair of slots being normal to the other pair, said aperture and said tines cooperating to receive a terminal portion of a central electrode of another cell in frictional fashion, the face being operative to make areal contact with the region of said other cell immediately surrounding the central electrode.

References Cited in the file of this patent

UNITED STATES PATENTS

| 1,950,616 | Kyle | Mar. 13, 1934 |
| 2,666,800 | Hoynes | Jan. 19, 1954 |
| 2,786,883 | Zelt | Mar. 26, 1957 |